United States Patent
Zhao et al.

(10) Patent No.: US 10,121,597 B2
(45) Date of Patent: Nov. 6, 2018

(54) TANTALUM WIRE USED FOR ANODE LEAD OF TANTALUM CAPACITOR AND MANUFACTURING METHOD THEREOF

(71) Applicant: Ningxia Orient Tantalum Industry Co., Ltd., Shizuishan (CN)

(72) Inventors: Bing Zhao, Shizuishan (CN); Linghui Du, Shizuishan (CN); Yongxu Xie, Shizuishan (CN); Qingfeng Wan, Shizuishan (CN); Huifeng Wang, Shizuishan (CN); Guohua Qiu, Shizuishan (CN)

(73) Assignee: NINGXIA ORIENT TANTALUM INDUSTRY CO., LTD., Shizuishan (CN)

( * ) Notice: Subject to any disclaimer, the term of this patent is extended or adjusted under 35 U.S.C. 154(b) by 264 days.

(21) Appl. No.: 14/882,249

(22) Filed: Oct. 13, 2015

(65) Prior Publication Data

US 2016/0035494 A1    Feb. 4, 2016

Related U.S. Application Data

(62) Division of application No. 13/145,209, filed as application No. PCT/CN2009/000556 on May 21, 2009.

(30) Foreign Application Priority Data

Jan. 20, 2009    (CN) .......................... 2009 1 0000894

(51) Int. Cl.
*H01R 43/00*    (2006.01)
*H01G 9/00*    (2006.01)
(Continued)

(52) U.S. Cl.
CPC .............. *H01G 9/0029* (2013.01); *B21B 1/18* (2013.01); *B22F 3/24* (2013.01); *B22F 5/12* (2013.01);
(Continued)

(58) Field of Classification Search
CPC ......... Y10T 29/49204; Y10T 29/49117; Y10T 29/49002; Y10T 29/49; H01G 9/0029; H01G 9/012; H01G 9/048; H01G 2009/05
(Continued)

(56) References Cited

U.S. PATENT DOCUMENTS

| | | | |
|---|---|---|---|
| 3,335,073 A | * | 8/1967 | Dunn ..................... C25D 11/26 205/152 |
| 3,788,721 A | | 1/1974 | Vause |

(Continued)

FOREIGN PATENT DOCUMENTS

| | | |
|---|---|---|
| CN | 1467765 | 1/2004 |
| CN | 101409150 A | 4/2009 |

(Continued)

OTHER PUBLICATIONS

Developement of Tantatalum wire in Capacitor in China—Wan-Rare Metal Letters—vol. No. 27, Year—2008.*

(Continued)

*Primary Examiner* — Peter DungBa Vo
*Assistant Examiner* — Azm Parvez
(74) *Attorney, Agent, or Firm* — Sterne, Kessler, Goldstein & Fox P.L.L.C.

(57) ABSTRACT

The present invention relates to a tantalum wire for anode lead of tantalum capacitors, characterized in that the cross section of the tantalum wire is approximate rectangular or regular rectangular. The present invention also relates to a process for manufacturing the tantalum wire, comprising the (Continued)

steps of: providing feedstock tantalum wire; subjecting the feedstock tantalum wire to heat treatment; subjecting the heat treated tantalum wire to surface pretreatment to form an oxide membrane on the surface-pretreated tantalum wire; rolling the surface-pretreated tantalum wire by lubricating with lubricant oil to make the cross section of the rolled tantalum wire being approximate rectangular or regular rectangular; subjecting the tantalum wire to final annealing.

17 Claims, 1 Drawing Sheet

(51) Int. Cl.

| | | |
|---|---|---|
| *H01G 9/012* | (2006.01) | |
| *H01G 9/048* | (2006.01) | |
| *B21B 1/18* | (2006.01) | |
| *B22F 3/24* | (2006.01) | |
| *B22F 5/12* | (2006.01) | |
| *C22C 1/04* | (2006.01) | |
| *H01G 9/052* | (2006.01) | |

(52) U.S. Cl.
CPC ............ *C22C 1/045* (2013.01); *H01G 9/012* (2013.01); *H01G 9/048* (2013.01); *B22F 2998/10* (2013.01); *B22F 2999/00* (2013.01); *H01G 9/052* (2013.01); *Y10T 29/49204* (2015.01)

(58) Field of Classification Search
USPC ................................ 29/825, 592.1, 592, 874
See application file for complete search history.

(56) References Cited

U.S. PATENT DOCUMENTS

| | | | | |
|---|---|---|---|---|
| 4,062,679 | A | * | 12/1977 | Marsh ...................... C22C 27/02 75/245 |
| 4,574,333 | A | | 3/1986 | Snyder |
| 5,327,454 | A | | 7/1994 | Ohtsuki et al. |
| 5,676,005 | A | | 10/1997 | Balliett |
| 6,400,556 | B1 | | 6/2002 | Masuda et al. |
| 6,517,645 | B2 | | 2/2003 | Fife |
| 6,775,127 | B2 | | 8/2004 | Yoshida |
| 8,066,783 | B2 | * | 11/2011 | Takeda ................... H01G 9/012 29/25.03 |
| 2009/0224232 | A1 | | 9/2009 | Naito |
| 2012/0300362 | A1 | | 11/2012 | Zhao et al. |

FOREIGN PATENT DOCUMENTS

| | | | |
|---|---|---|---|
| JP | 60-113623 | U | 8/1985 |
| JP | 64-53533 | A | 3/1989 |
| JP | 07-029777 | A | 1/1995 |
| JP | 2000-012387 | A | 1/2000 |
| JP | 2001-085273 | A | 3/2001 |
| JP | 2003-217974 | A | 7/2003 |
| JP | 2005-064038 | A | 3/2005 |
| JP | 2006-176841 | A | 7/2006 |
| JP | 2007-182548 | A | 7/2007 |
| JP | 2008-305824 | A | 12/2008 |
| JP | 4798717 | B2 | 10/2011 |
| KR | 10-2003-0028318 | | 4/2003 |
| SU | 1204386 | A1 * | 1/1986 |

OTHER PUBLICATIONS

Qingfeng et al., Review on Development of Tantalum Wire in Capacitor in China, Rare Metals Letters, vol. 27, Issue 2, pp. 9-13, 2008 (English language translation).
Supplemental Extended European Search Report for European Application No. 09838599.0, dated Mar. 15, 2018.
International Search Report (ISR) for PCT/CN2009/000556, I.A. fd: May 21, 2009, dated Oct. 29, 2009, from the State Intellectual Property Office, Beijing, China.
International Preliminary Report on Patentability (IPRP), Chapter I of the Patent Cooperation Treaty, including the Written Opinion for PCT/CN2009/000556, I.A. fd:May 21, 2009, dated Jul. 26, 2011 from the International Bureau of WIPO, Geneva, Switzerland.
Wan Qingfeng et al., "Review on Development of Tantalum Wire in Capacitor in China," Rare Metals Letters 27(2): 9-13 (Feb. 2008), Rare Express Editorial, Northwest Nonferrous Metal Research Institute, China.
First Office Action for Chinese patent application No. 200910000894.3, dated Jul. 13, 2010, The State Intellectual Property Office of the People's Republic of China, Beijing, China.
Second Office Action for Chinese patent application No. 200910000894.3, dated Jul. 4, 2011, The State Intellectual Property Office of the People's Republic of China, Beijing, China.
Wan, Qingfeng in "The influence of doping trace elements on the structure and properties of tantalum wire," Sections 3.2.1, 3.3.3 and 3.4, Central South University, China, Apr. 2008, pp. 33-34 and 50-51.
"Office Action (Reason for Refusal)," for Korean Patent Application No. 10-2011-7019413, dated Sep. 17, 2012, The Korean Intellectual Property Office, Seoul, Korea.
"Communication of Results of the Examination on the Merits," for Mexican Patent Application No. MX/a/211/007734, dated Mar. 8, 2013, The Mexican Institute of Industrial Property, Mexico City, Mexico.
"Notification on Result of Substantive Examination" dated Jun. 17, 2013 and "Result of First Stage of Substantive Examination" for Indonesian patent application No. W00201103001, Department of Justice and Human Rights of Republic of Indonesia, Tangerang, Indonesia.
"Notification of Reasons for Rejection," for JP Patent Application No. 2011-545609, dated Jul. 10, 2013 from the Japanese Patent Office, Tokyo, Japan.
Translation of claims of JP 60-113623 U, Aug. 1, 1985, NEC Corporation.
English language summary of office action for Mexican National Patent Appl. No. MX/a/2011/007734 dated Dec. 10, 2013 from the Instituto Mexicano de la Propiedad Industrial, Jardines del Pedregal, Mexico.
English-Language Abstract for Japanese Patent Publication No. JP 07-029777 A, published Jan. 31, 1995.
English-Language Abstract for Japanese Patent Publication No. JP 2005-064038 A, published Mar. 10, 2005.
English-Language Abstract for Japanese Patent Publication No. JP 2006-176841 A, published Jul. 6, 2006.
Development of Tantalum Wire in Capacitor in China. 2008, Qingfeng et al.
"Office Action (Reason for Refusal)," for Korean Patent Application No. 10-2011-7019413, dated May 20, 2013, The Korean Intellectual Property Office, Seoul, Korea.
"Notification of Reasons for Refusal," for JP Patent Application No. 2014-042437, drafted Feb. 3, 2015 from the Japanese Patent Office, Tokyo, Japan.
"Decision of Refusal," for JP Patent Application No. 2014-042437, drafted Sep. 4, 2015 from the Japanese Patent Office, Tokyo, Japan.
"Notification of Reasons for Refusal," for JP Patent Application No. 2011-545609, dated Jul. 31, 2014 from the Japanese Patent Office, Tokyo, Japan.
"Notification of Reasons for Refusal," for JP Patent Application No. 2011-545609, dated Dec. 4, 2013 from the Japanese Patent Office, Tokyo, Japan.
"Decision to Grant a Patent," for JP Patent Application No. 2011-545609, dated Dec. 4, 2013 from the Japanese Patent Office, Tokyo, Japan.
"Decision to Grant a Patent," for JP Patent Application No. 2011-545609, dated Feb. 3, 2015 from the Japanese Patent Office, Tokyo, Japan.

* cited by examiner

TANTALUM WIRE USED FOR ANODE LEAD OF TANTALUM CAPACITOR AND MANUFACTURING METHOD THEREOF

TECHNICAL FIELD

The present invention relates to tantalum wire used for tantalum capacitor and manufacturing method thereof.

BACKGROUND ART

Tantalum capacitors have been widely used in fields of telecommunication, computer, automobile, household appliance, aerospace et al. Tantalum electrolytic capacitors manufactured with tantalum powder as an anode and tantalum wire as anode lead have the advantages of small volume, large electric capacity, high degree of chip type, good reliability, and long service life, and therefore can operate normally under extreme conditions under which many other capacitors (such as ceramic, aluminum sheet capacitors, etc.) cannot operate.

As to tantalum wire for anode lead of tantalum capacitors, it is required to have high chemical purity, good surface finish and precise dimensions, with its mechanical properties and electronic properties satisfying the strict demands or capacitors. For example, the specific demands on surface finish of tantalum wire are as follows, the surface has no obvious defects such as grooves, burrs, and sand holes, if observed under microscope of 60 magnification or more, and the specific requirement on electronic properties is leakage current, which the smaller the better.

With the development on electronic techniques, the requirements on the tantalum capacitors have been become increasingly strict. Tantalum capacitors have been developed, step by step, towards miniaturization, chip-type, and high capacity, with the tantalum powder used having higher and higher specific capacity. The above correspondingly restricts the sintering temperature of anode pellet of tantalum capacitors. If the sintering temperature is too high, the porosity of tantalum powder is reduced largely, and thereby decreasing the specific capacity of tantalum capacitors.

However, if conventional circular anode lead is used on low-temperature sintered tantalum capacitors, the following problems will arise, the anode lead made with circular tantalum wire has small contact area with tantalum anode pellet due to its relative small surface area, thereby leading to low contact strength and excessive leakage current of tantalum capacitor, even leading to the shedding of the tantalum wire from the anode pellet which will result the failure of the tantalum capacitor. With further development of miniaturization, of tantalum capacitors, the problem of low pullout strength of lead wire of tantalum capacitors has more and more disadvantageous effect on the electronic properties and reliability of tantalum capacitors.

Although it was suggested in the early $21^{th}$ century that tantalum wire of non-circular cross section was used to replace present tantalum wire of circular cross section to solve this problem. However, until now, among the tantalum capacitor manufacturing techniques, almost all the tantalum wires are of circular cross section. The reasons are as follows, none of the manufacturers can produce special-shaped tantalum wires whose chemical purity, surface finish, mechanical properties and electronic properties can meet the requirements of tantalum capacitors, in many cases, it is the surface finish, mechanical properties and/or electronic properties cannot meet the strict requirements of tantalum capacitors.

SUMMARY OF THE INVENTION

As to one or more problems existing in the prior art, the present invention provides a special-shaped tantalum wire which meets the strict requirements of anode lead of tantalum capacitors and the manufacturing method thereof.

Particularly, the present invention provides tantalum wire for anode lead of tantalum capacitors, characterized in that the cross section of the tantalum wire is approximate rectangular or regular rectangular.

The present invention also provides a process for manufacturing tantalum wire, comprises the steps of:
(1) providing the feedstock tantalum wire;
(2) subjecting the feedstock tantalum wire to heat treatment;
(3) subjecting the heat treated tantalum wire to surface pretreatment to form an oxide membrane on the treated tantalum wire;
(4) rolling the surface-pretreated tantalum wire which lubricated by lubrication to make the cross section of the rolled tantalum wire being approximate rectangular or regular rectangular;
(5) subjecting the tantalum wire to final annealing.

EMBODIMENTS

Figure 1:
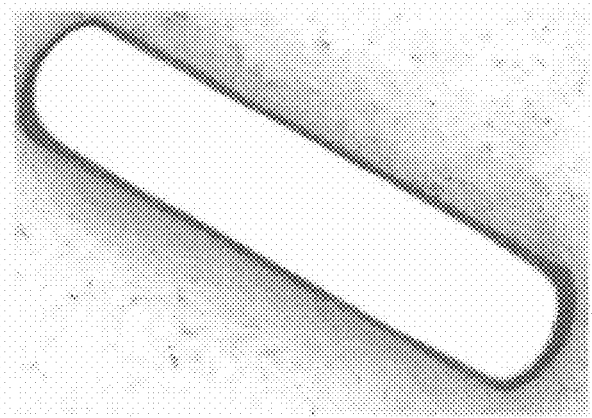
FIG. 1: Photographs of the cross-section of tantalum wire according to the present invention (100 times magnification)
Figure 2:
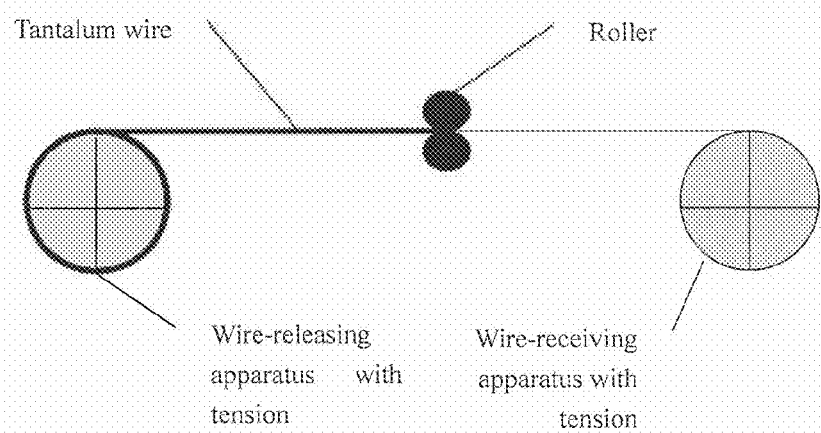
FIG. 2: Schematic diagram of rolling the tantalum wire according to the present invention.

It can be understood that above descriptions and following embodiments are only demonstrative explanations. Those skilled in the art can make various improvements, modifications or changes to these embodiments, without deviating from the spirit and scope of the invention.

In the present invention, the measurement of electronic properties was conducted based on the method of GB3463-1995 *tantalum wire, the National Standard of PRC*; the property of pullout strength was tested by the method of testing mechanical property according to GB3463-1995 *tantalum wire*, after molded in terms of following parameters:
1. Molding equipment: automatic molding machine for tantalum electrolytic capacitor
2. Shell type: E
3. Powder amount: 381-392 mg
4. Anode pellet size: 5.7×4.1×2.9 mm
5. Tantalum wire embedment quantity: 1.6-1.9 mm
6. Density after molding: 5.5-5.6 $g/cm^3$:

In a preferred embodiment of the present invention, as to electronic property, the leakage current of the tantalum wire according to the invention is not more than 0.95 $\mu A/cm^2$, preferably not more than 0.90 $\mu A/cm^2$, more preferably not more than 0.80 $\mu A/cm^2$, further preferably not more than 0.60 $\mu A/cm^2$, furthermore preferably not more than 0.50 $\mu A/cm^2$, particularly preferably not more than 0.30 $\mu A/cm^2$, more particularly preferably not more than 0.20 $\mu A/cm^2$, more particularly preferably not more than 0.15 $\mu A/cm^2$, especially not more than 0.10 $\mu A/cm^2$.

In another preferred embodiment of the present invention, as to mechanical property, the pullout strength of the tantalum wire according to the present invention is 150 MPa or more, preferably 160 MPa or more, more preferably 170 MPa or more, further preferably 175 MPa or more, furthermore preferably 180 MPa or more, particularly preferably 185 MPa or more, more particularly preferably 190 MPa or more, most preferably 195 MPa or more.

In another preferred embodiment of the present invention, when the cross section of the tantalum wire is approximate rectangular, the cross section size of the cross section is 0.5-4 mm long, preferably 1-3 mm long, with 0.015-1 mm wide, preferably 0.02-0.5 mm wide, and the two sides on the width direction are curved In another preferred embodiment of the present invention, when the cross section of the tantalum wire is regular rectangular, the cross section size of the cross section is 0.5-4 mm long, preferably 1-3 mm long, 0.015-1 mm wide, preferably 0.02-0.5 mm wide.

In a preferred embodiment of the present invention, the heat treatment of feedstock tantalum wire is carried out by heating at the recrystallization temperature or higher, preferably 1000-1450° C., preferably 1200-1400° C., and holding for 30-60 minutes, preferably 40-60 minutes.

In an embodiment of the invention, the cross section of feedstock tantalum wire is circular.

At the same time, in a preferred embodiment of the present invention, in order to prevent the oxidation of wire material and benefit the impurity evolution from the feedstock tantalum wire, vacuum annealing can be employed. In a preferred embodiment of the present invention, the vacuum degree of the vacuum annealing step is greater than $5.0 \times 10^{-2}$ Pa with leakage less than 0.5 Pa/min.

In a preferred embodiment of the present invention, in order to prevent roll sticking during rolling of tantalum metal thereby affecting the surface quality of special-shaped tantalum wire product, circular tantalum wire is subjected to surface pretreatment at high temperature in oxygen atmosphere.

In a preferred embodiment of the present invention, circular tantalum wire is rolled using precision rolling mill. In further preferred embodiment, pass reduction is 10-95% (thickness reduction), and one or more pass(es) can be performed to the desired size.

In a preferred embodiment of the present invention, in order to prevent non-uniform lubrication during rolling thereby affecting the surface quality of special-shaped tantalum wire product, lubricant oil is employed for lubrication during rolling.

In a preferred embodiment of the present invention, the lubricant oil is organic fluoro-chloro lubricant oil. In a preferred embodiment of the present invention, working roll can be grooved roller or flat roller.

In a preferred embodiment of the present invention, to enhance rolling effect, special-shaped roll can be employed, such as arc-shaped roll and convex roll.

In a preferred embodiment of the present invention, the rolled special-shaped tantalum wire product is cleaned with degreasing agent, and washed with clear water. At the meantime, if desired, ultrasonic wave can be applied.

In a preferred embodiment of the present invention, the rolled special-shaped tantalum wire product is annealed by heating at the temperature of the recrystallization temperature or above, using continuous wire drawing annealing. In further preferred embodiment, to prevent the oxidation of wire, the operation is carried out under the protection of inert gas, such argon.

In a preferred embodiment of the present invention, the annealing temperature of the rolled special-shaped tantalum wire product is 1600-2000° C., and the rate is 5-10 m/min.

According to the present invention, the curvature of wire reel should not be too large, otherwise, special-shaped tantalum wire product will bend in a large extend, and therefore cannot meet the requirements. In a preferred embodiment of the present invention, the wire reel used has a diameter from φ200 mm to φ300 mm.

Example 1

Circular tantalum wire having a diameter of 0.97 mm was wound in a spool with the diameter of 300 mm, and placed into annealing furnace. The furnace was evacuated with vacuum pump. When the vacuum degree in the furnace reached to $5.0 \times 10^{-2}$ Pa, the furnace was electrically heated to a temperature of 1380° C. hold for 60 minutes. After the heating was stopped, the furnace was naturally cooled. When the furnace was cooled to 180° C., in order to accelerate cooling and increase efficiency, inert gas such as argon could be introduced into the furnace.

The annealed circular tantalum wire was subjected to surface pretreatment in a muffle furnace. The annealed circular tantalum wire was placed in a muffle furnace. After 99% high purity oxygen was introduced into the furnace, the furnace was heater to 600° C. and hold for 10 minutes, so that the circular tantalum wire was subjected to surface pretreatment. The pretreated circular tantalum wire was straightened and wound on a tray. The whole tantalum wire should not be bended.

The tantalum wire wound on the tray was placed on wire-releasing apparatus with tension, and was rolled using 12 rolls precision rolling machine. Organic fluoro-chloro lubricant oil was used for lubrication during rolling. During rolling, first pass was carried out with reduction rate of 38%, with the size after rolling being 0.60×1.11 mm. Second pass was carried out with reduction rate of 43%, with the size after rolling being 0.34×1.36 mm. The surface of rolled tantalum wire was with good surface finish, has no defects such as rolling impressions, edge cracks, grooves or sand holes.

The rolled special-shaped tantalum wire was placed on a wire-releasing apparatus with tension. The oil stains and other impurities on the surface of the special-shaped tantalum wire was washed with degreasing agent which was diluted to suitable concentration and water, under the action of ultrasonic wave. The tantalum wire was wound on wire-receiving apparatus. The cleaned special-shaped tantalum wire was placed on a wire-releasing apparatus with tension, subjected to continuous wire drawing annealing. The annealing was 1750° C., and the drawing rate was 5 m/min. The tantalum wire was wound on wire-receiving apparatus until the whole special-shaped tantalum wire on the wire-releasing apparatus was all wound on the wire-receiving apparatus, and thus the manufacture of special-shaped tantalum wire is completed Example 2

Feedstock (circular tantalum wire) has the diameter of 0.78 mm, and three passes rolling was conducted. The rest steps were the same as described in Example 1. The dimension of each pass was changed as follows:

φ0.78–0.43×1.19–0.27×1.22–0.23×1.24

Example 3

Feedstock (circular tantalum wire) has the diameter of 0.65 mm, and three passes rolling was conducted. The rest steps were the same as described in Example 1. The dimension of each pass was changed as follows:

φ0.65–0.37×1.09–0.20×1.11–0.15×1.12

Comparative Example 1

Feedstock (circular tantalum wire) has the diameter of 0.97 mm. Surface pretreatment was not carried out. White oil for rolling was employed during rolling course to lubricate and cool. The rest steps were the same as described in Example 1.

Comparative Example 2

Feedstock circular tantalum wire) has the diameter of 0.78 mm. Surface pretreatment was not carried out. White oil for rolling was employed during rolling course to lubricate and cool. The rest steps were the same as described in Example 2.

Comparative Example 3

Feedstock (circular tantalum wire) has the diameter of 065 mm. Surface pretreatment was not carried out. White oil for rolling was employed during rolling course to lubricate and cool. The rest steps were the same as described in Example 3.

Comparative Example 4

Qualified circular tantalum wires for anode lead of tantalum capacitors with same cross section area as the special-shaped tantalum wire of 0.34×1.36 mm, 0.23×1.24 mm and 0.15×1.12 mm were employed, with their diameters being φ0.767 mm, φ0.603 mm and φ0.463 mm, respectively.

The properties of circular tantalum wires and special-shaped tantalum wires in the examples were tested as follows:

TABLE 1

Pullout strength of circular tantalum wires and special-shaped tantalum wire in the examples

| No. | Dimension (mm) | Cross-section area (mm$^2$) | Pullout force (N) | Pullout strength (MPa) | Notes |
| --- | --- | --- | --- | --- | --- |
| 1 | 0.34 × 1.36 | 0.462 | 86.5 | 187.3 | Example 1 |
| 2 | φ0.767 | 0.462 | 65.1 | 140.9 | Comparative Example 4 |
| 3 | 0.23 × 1.24 | 0.285 | 55.6 | 195.0 | Example 2 |
| 4 | φ0.603 | 0.285 | 40.6 | 142.5 | Comparative Example 4 |
| 5 | 0.15 × 1.12 | 0.168 | 33.9 | 201.6 | Example 3 |
| 6 | φ0.463 | 0.168 | 24.4 | 145.3 | Comparative Example 4 |

TABLE 2

Electronic properties of circular tantalum wires and special-shaped tantalum wire in the examples

| No. | Dimension (mm) | Leakage current (μA/cm$^2$) | Notes |
| --- | --- | --- | --- |
| 1 | 0.34 × 1.26 | 0.10 | Example 1 |
| 2 | 0.34 × 1.26 | 1.26 | Comparative Example 1 |
| 3 | 0.23 × 1.24 | 0.09 | Example 2 |
| 4 | 0.23 × 1.24 | 0.98 | Comparative Example 2 |
| 5 | 0.15 × 1.32 | 0.11 | Example 3 |
| 6 | 0.15 × 1.12 | 1.26 | Comparative Example 3 |

The invention claimed is:

1. A process for manufacturing a tantalum wire, comprising the steps of:
    subjecting a feedstock tantalum wire to a heat treatment to form a heat-treated tantalum wire;
    subjecting the heat-treated tantalum wire to a surface pretreatment to form an oxide membrane on the heat-treated tantalum wire to form a surface-pretreated tantalum wire;
    rolling the surface-pretreated tantalum wire that is coated with the oxide membrane while lubricating with a lubricant oil to form a rolled tantalum wire with a cross section of the rolled tantalum wire being rectangular with curved corners; and
    annealing the rolled tantalum wire, wherein
    the surface pretreatment is performed at a temperature of 500-700° C. in 99% pure oxygen atmosphere for 1 minute to 1 hour.

2. The process according to claim 1, wherein the heat treatment includes a vacuum annealing at a temperature of 1000-1450° C. for 30-60 minutes.

3. The process according to claim 1, wherein the rolling includes a plurality of passes and a reduction rate of each pass is 20-95%.

4. The process according to claim 1, wherein the annealing is intervened by the rolling to eliminate stress.

5. The process according to claim 1, wherein the annealing includes a vacuum annealing at a temperature of 1000-1450° C. for 30-60 minutes.

6. The process according to claim 1, wherein the rolled tantalum wire is cleaned after the rolling and before a final step of the annealing.

7. The process according to claim 1, wherein a final step of the annealing is a continuous wire drawing annealing with an annealing temperature of 1600-2000° C. and a wire drawing rate of 5-10 meters per minute.

8. The process according to claim 1, wherein the lubricant oil is an organic fluoro-chloro lubricant oil.

9. The process according to claim 1, wherein the heat treatment is performed at a temperature equal to or higher than a crystallization temperature of the feedstock tantalum wire.

10. The process according to claim 2, wherein the vacuum annealing is at a temperature of 1200-1400° C. for 40-60 minutes.

11. The process according to claim 1, wherein the surface pretreatment is performed at the temperature of 500-700° C. in 99% pure oxygen atmosphere for 5-30 minutes.

12. The process according to claim 3, wherein the reduction rate of each pass is 20-90%.

13. The process according to claim 12, wherein the reduction rate of each pass is 22-85%.

14. The process according to claim 5, wherein the vacuum annealing is at a temperature of 1200-1400° C. for 40-60 minutes.

15. The process according to claim 7, wherein the final step of the annealing is performed at an annealing temperature of 1700-1800° C.

16. The process according to claim 1, wherein the annealing is performed at a temperature equal to or higher than a recrystallization temperature of the rolled tantalum wire in an inert gas atmosphere.

17. The process according to claim 1, wherein the rolling is performed by at least one of a grooved roller, a flat roller, an arc-shaped roller, and a convex roller.

* * * * *